United States Patent [19]
Frizelle

[11] 3,842,671
[45] Oct. 22, 1974

[54] FLOWMETER
[75] Inventor: William G. Frizelle, Florissant, Mo.
[73] Assignee: Emerson Electric Co., St. Louis, Mo.
[22] Filed: Apr. 11, 1973
[21] Appl. No.: 350,106

[52] U.S. Cl. .............................................. 73/209
[51] Int. Cl. .............................................. G01f 1/00
[58] Field of Search ........................... 73/207–208, 73/209, 210, 323; 116/117, 118; 138/DIG. 11, 172

[56] References Cited
UNITED STATES PATENTS
| | | | |
|---|---|---|---|
| 2,130,981 | 9/1938 | Fischer et al. | 73/209 |
| 2,441,350 | 5/1948 | Fischer | 73/209 |
| 2,778,223 | 1/1957 | Kimbrell | 73/209 |

OTHER PUBLICATIONS
Brooks-Mite Flow Indicators, Brooks Instrument Division Emerson Electric, Hatfield, Penn., Bulletin DS2001, Feb. 1966.
Dwyer Flowmeters, Dwyer Instruments Inc., Michigan City, Indiana, Bulletin F–41, 1969.

Primary Examiner—James J. Gill
Assistant Examiner—John P. Beauchamp
Attorney, Agent, or Firm—Charles E. Markham

[57] ABSTRACT

A molded transparent plastic flowmeter comprising an elongated body having a tapered longitudinal float bore formed therein, the bore having surface portions spaced around the wall thereof which extend parallel to the bore axis and guide a float centrally in the tapered bore. Passages are formed at both ends of the body communicating with the bore to provide alternate arrangements of a control valve and connections of inlet and outlet conduits. The body portion coextending with the float bore is fluted in a manner to reduce sectional thickness, maintain structural rigidity, and provide a desired image of a float in the bore.

5 Claims, 10 Drawing Figures

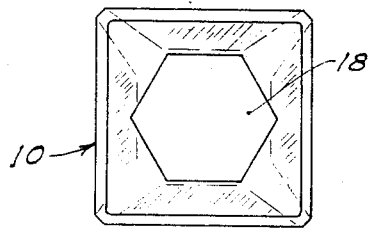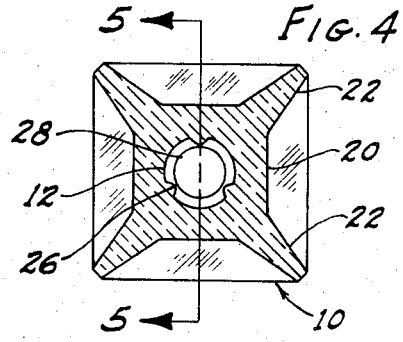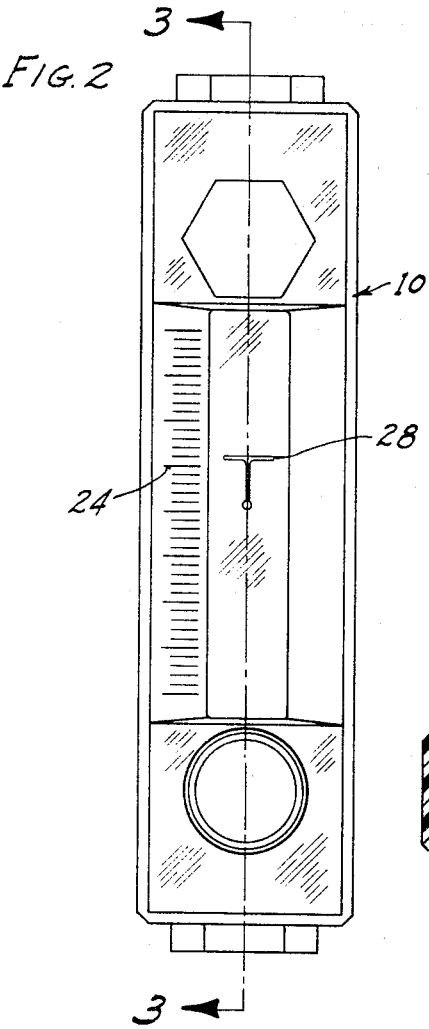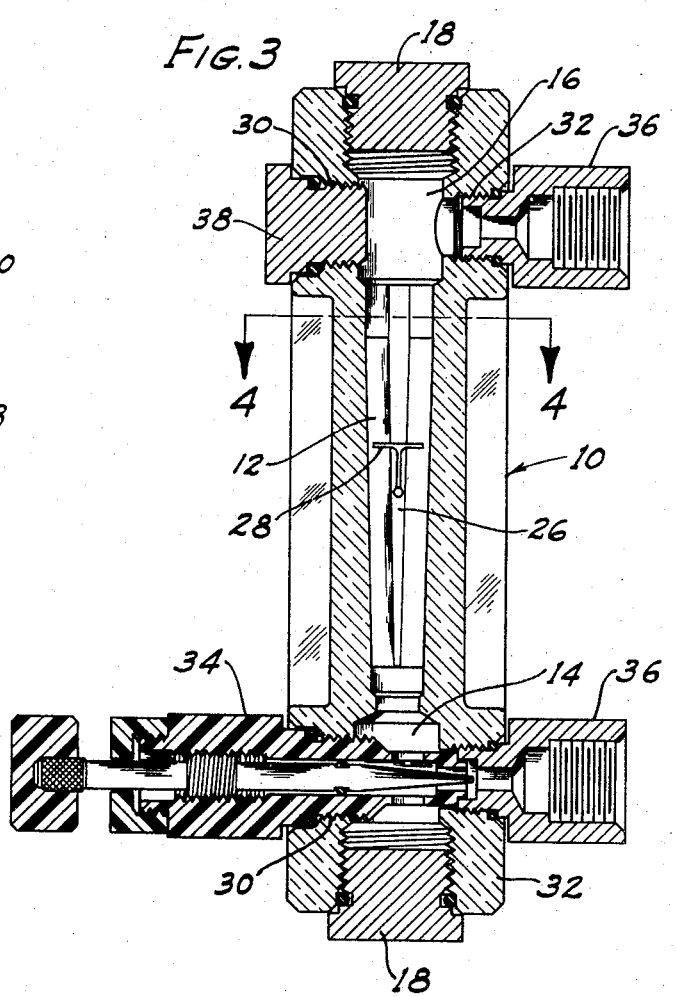

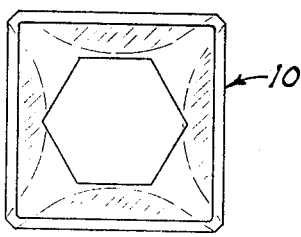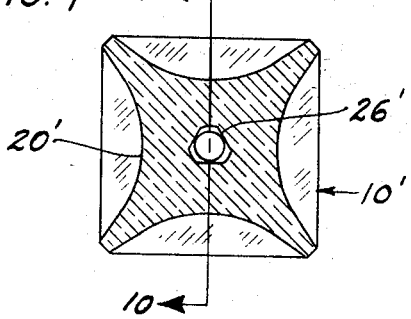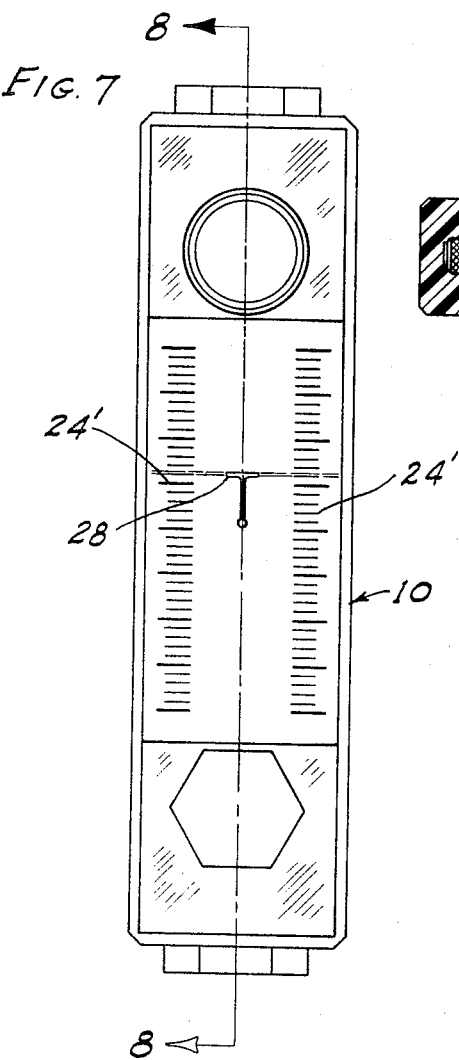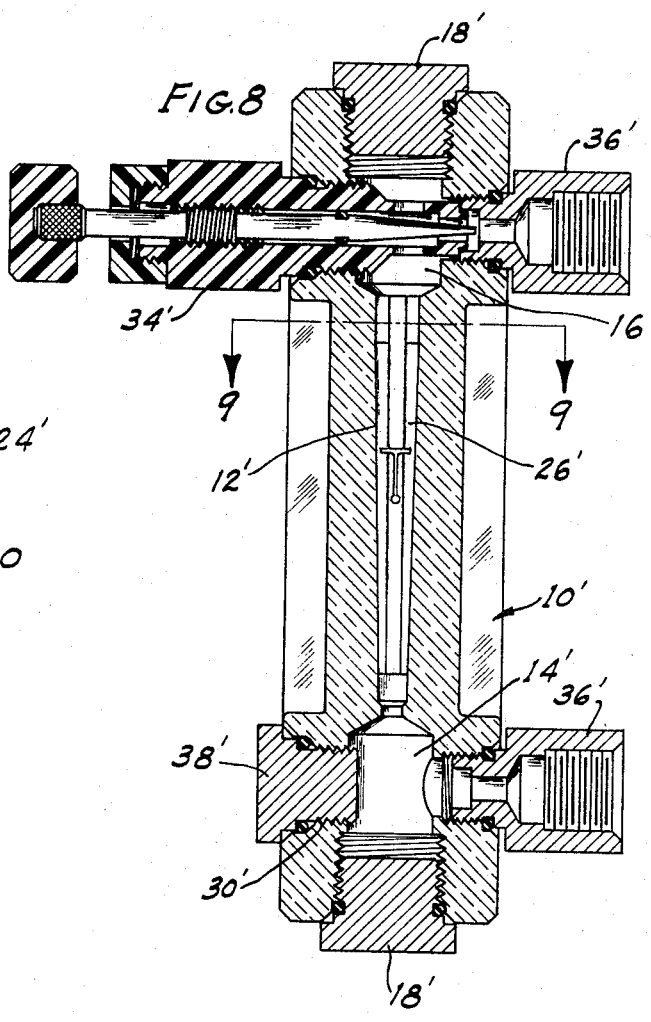

FLOWMETER

This invention relates to flowmeters of the type having a vertical tapered bore with a float therein indicating the rate of flow. It particularly relates to a flowmeter of this kind in which the float bore is formed in a rigid transparent body which includes inlet and outlet openings for the connection of fluid conduits.

It has been the practice heretofore to fabricate plastic flowmeters of this kind by machining a length of square transparent plastic bar stock. That is, the tapered float bore was formed by drilling and then reaming with a tapered reamer, and the inlet and outlet passages adapted to receive and connect the control valve and fluid conduits thereto were drilled in an arrangement to meet customer requirements. Also, the read-out scale was hot-stamped on one side of the body in a separate operation. This method of manufacture involved a considerable number of separate operations, and a lower cost method, such as injection molding the body complete with a tapered bore, inlet and outlet passages, and a read-out scale, was considered. It was also found desirable to provide means in this type of flowmeter to guide the indicating float element centrally in the tapered bore throughout its travel therein. This provision substantially enhances the consistency of the flowmeter readings.

Problems were encountered, however, in attempting to mold an elongated meter body having sufficient cross-sectional area to provide the strength and rigidity required with a relatively small diameter and highly accurate, longitudinal, tapered float bore therein. Particularly, the problem encountered is that of cooling the hot plastic material in the mold in a manner to preclude voids and distortions. While this problem is common in molding metals, it is well known that synthetic thermoplastic materials are particularly poor heat conductors and have high coefficients of thermal expansion relative to metals, so that distortions resulting from the unequal cooling of the surfaces and interior portions of thick sections of this material present a serious problem. This is particularly so when a high degree of accuracy is required and when the surfaces of the transparent material must be free of any slight irregularities which would distort the image of the float.

Also, of course, the time required to cool relatively thick sections increases the molding time and amount of material used and, therefore, increases manufacturing cost. In reducing thick sections of the body portion coextending with the tapered bore by whatever means to overcome these problems, it is also essential to provide an exterior surface configuration which will result in a desired image of the float element.

Accordingly, it is an object of this invention to provide a molded, transparent, plastic flowmeter body having a tapered float bore therein in which thickness of the material is reduced in a novel manner so as to achieve more rapid and uniform cooling of the mold while maintaining strength and rigidity and providing an exterior surface configuration resulting in a desired image of a float in the bore.

A further object is to provide a transparent, molded, plastic flowmeter body having a tapered float bore formed therein and including wall portions of the bore formed so as to centrally guide a float therein.

A further object is to provide a transparent, molded, plastic flowmeter body having a float bore formed therein and a plurality of openings formed in each end of the body for connection thereto of a flow control valve and inlet and outlet conduits in various arrangements.

Further objects and advantages will appear from the following description when read in connection with the accompanying drawings.

IN THE DRAWINGS:

FIG. 1 is a top plan view of a flowmeter constructed in accordance with the present invention;

FIG. 2 is a front elevational view of the flowmeter shown in FIG. 1;

FIG. 3 is a longitudinal cross-sectional view taken along line 3—3 of FIG. 2;

FIG. 4 is a cross-sectional view taken along line 4—4 of FIG. 3;

FIG. 6 is a top plan view of a modified form of the flowmeter shown in FIG. 1;

FIG. 7 is a front elevational view of the modified form shown in FIG. 1;

FIG. 8 is a longitudinal cross-sectional view of the modified form taken along line 8—8 of FIG. 7;

FIG. 9 is a cross-sectional view taken along line 9—9 of FIG. 8; and

Figure 5:
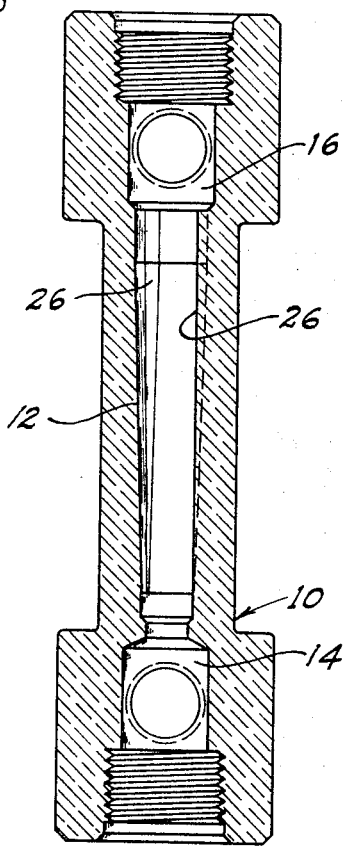
FIG. 5 is a longitudinal cross-sectional view taken along line 5—5 of FIG. 4.

Referring to FIGS. 1 to 5 of the drawings, an elongated flowmeter body, generally indicated at 10, is formed by injection molding as a casting of relatively hard, rigid, transparent, thermoplastic material under controlled temperature conditions, resulting in a casting free of voids and distortions. The body preferably has a generally square, cross-sectional configuration, but it may be round. A longitudinal tapered bore 12 extends through an intermediate portion of the length of body 10 and terminates at its small end in a counterbore 14 and at its large end in a counterbore 16. The outer end portions of counterbores 14 and 16 are screw threaded and receive screw-threaded closing plugs 18.

That portion of the body 10 coextending with the tapered bore 12 is recessed or fluted on four sides to reduce material thickness. These flutes are defined by a flat, bottom surface 20 and diverging flat side surfaces 22. The bottom surfaces 20 of opposite flutes are parallel and at least wide enough to include a float in the tapered bore, and the angle of divergence of the side surfaces 22 is such as to preclude multiple images of the float appearing thereon. At least one of the diverging side surfaces is provided with a read-out scale 24 formed in the process of casting the body 10.

Referring to FIG. 4, showing the cross-sectional configuration of tapered bore 12, it will be seen that the bore is provided with three wall surface portions 26 which extend the full length of the bore parallel with its axis, as shown in FIG. 5. The diameter of a circle touching the parallel extending wall surface portions 26 is approximately equal to the small diameter of the tapered bore 12. It will be seen, therefore, that a round or cylindrical flow indicating float 28 slightly smaller in diameter than such circle will be guided centrally throughout its travel in the tapered bore 12.

The square end portions of the body 10 are further provided with transverse screw-threaded openings 30 and 32 leading to the counterbores 14 and 16. Screw-threaded openings 30 at both ends of the body permit interchangeable mounting of a flow control valve 34, and screw-threaded openings 32 receive screw-threaded fittings 36 for the interchangeable connection of inlet and outlet conduits. One of the openings 30 is provided with a screw-threaded closure plug 38.

Figure 10:
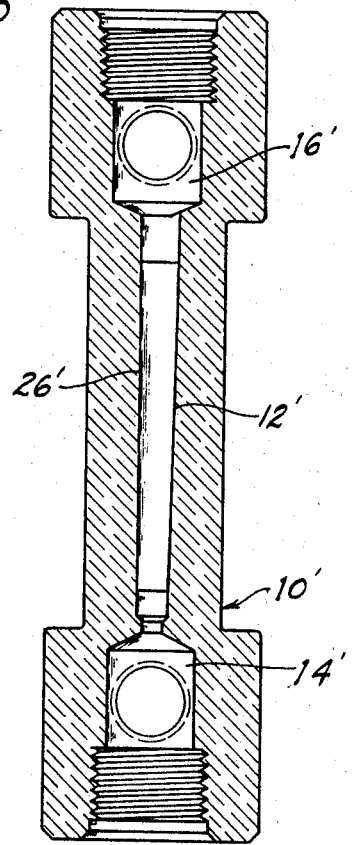
FIG. 10 is a longitudinal cross-sectional view taken along line 10—10 of FIG. 9.

In the modification shown in FIGS. 6 to 10 of the drawings, the tapered bore 12' has three equally spaced, flat, wall surface portions 26', as shown in FIG. 9, which surfaces extend parallel with the axis of the bore throughout its length, as shown in FIG. 10. The diameter of a circle touching the three, flat, wall surface portions is substantially equal to the small diameter of the tapered bore 12', so that a round or cylindrical flow indicating float 28' therein of slightly smaller diameter than such circle will be guided centrally throughout its travel in tapered bore 12'.

That portion of the body 10', in FIGS. 6 to 10, which extends with the tapered bore 12' is recessed or fluted on four sides in a manner to reduce material thickness and to provide a continuous image of the float 24' extending substantially across the flute. To achieve this image of the float, the flutes are defined by a curved surface 20', as shown in FIG. 9, and one fluted side is provided with two read-out scales 24', one on each side of the float bore. The square end portions of the body 10' in the modification shown in FIGS. 6 to 10 also have transverse screw-threaded passages 30' and 32' leading to counterbores 14 and 16. In this modification, a control valve 34' is shown mounted at the large end of the tapered float bore in FIG. 8 instead of at the small end as in FIG. 3.

It will be seen from the foregoing that I have provided a flowmeter body particularly adapted to being formed as a casting of synthetic thermoplastic material. The body has sufficient rigidity to permit the screw-threaded connection thereto of rigid supporting inlet and outlet fluid conduits, while being reduced in cross-sectional area in a manner to facilitate more uniform as well as more rapid cooling of the mold. The cross-sectional area of an intermediate portion of the length of the body is reduced by the tapered float bore and by fluting and the cross-sectional area of the end portions thereof by large diameter counterbores. The longitudinal passageway extending completely through the body and comprising the tapered bore 12 and counterbores 14 and 16 permits passing a cooling fluid therethrough during molding, thereby to control the relative cooling rates of the interior and exterior surfaces of the body.

I claim:

1. In a flowmeter, a rigid elongated injection molded body member of transparent thermoplastic material having a tapered float bore formed therein coextending with an intermediate portion of the length thereof and counterbores extending from the ends of said tapered bore to the ends of said body, a flow rate indicating float in said bore, and said intermediate portion of said body being fluted to substantially reduce the cross-sectional area thereof whereby the cross-sectional area of said body is reduced throughout its length while maintaining its rigidity, a pair of transverse opposed and axially aligned screw-threaded bores in each end of said body intersecting said counterbores, a conduit connector and a flow control valve mounted in screw-threaded engagement in said pair of transverse screw-threaded bores at one end of said body, a closure plug and a conduit connector mounted in screw-threaded engagement in said pair of transverse screw-threaded bores at the other end of said body, said conduit connectors having surfaces engaged by said control valve to control the flow through said tapered bore, and said flow control valve and said closure plug having similar screw-threaded portions whereby they may be interchangeably mounted at the ends of said body.

2. The flowmeter claimed in claim 7 in which there are four flutes formed in said intermediate body portion, in which the surface defining each flute comprises a flat bottom surface portion and two flat outwardly diverging side surface portions, in which said bottom surface portion is at least as wide as the diameter of said float, in which the angle of divergence of said side surface portions is such as to preclude secondary images of said float, and in which a rate-of-flow scale is molded in at least one of said side surface portions.

3. The flowmeter claimed in claim 7 in which there are four flutes formed in said intermediate body portion, in which the surface defining each flute is curved, in which the curvature of the surface defining at least one of said flutes is such as to provide an image of said float extending substantially across the width of said flute, and in which a rate-of-flow scale is molded in the surface defining at least one of said flutes.

4. An elongated injection molded flowmeter body of transparent thermoplastic material having sufficient rigidity to be self-supporting when directly connected to piping conducting the flow of fluid to be metered, said body having a tapered float bore extending through an intermediate portion of its length and substantially larger diameter counterbores extending from the ends of said tapered bore to the ends of said body, and said intermediate portion of said body coextending with said float bore being fluted to substantially reduce its cross-sectional area whereby the cross-sectional area of said body is substantially reduced throughout its length, said intermediate portion of said body having four equal flutes, the surface of each flute being defined by a flat bottom surface and two outwardly diverging flat surfaces thereby to provide four radial stiffening ribs, said flat bottom portions being at least as wide as the larger diameter of said float bore and the angle of divergence of said side surface portions being such as to preclude secondary images of a float in said float bore.

5. The flowmeter body claimed in claim 11 which further includes a rate-of-flow scale molded in at least one of said diverging side surfaces of at least one of said flutes.

* * * * *